US010279520B2

(12) United States Patent
Schum et al.

(10) Patent No.: US 10,279,520 B2
(45) Date of Patent: May 7, 2019

(54) PROCESS FOR THE PRODUCTION OF THREE-DIMENSIONAL PATTERNS IN PLASTIC MOULDINGS

(71) Applicant: MERCK PATENT GMBH, Darmstadt (DE)

(72) Inventors: Markus Schum, Reichelsheim (DE); Rainer Linzmeier, Gross-Zimmern (DE)

(73) Assignee: MERCK PATENT GMBH, Darmstadt (DE)

( * ) Notice: Subject to any disclaimer, the term of this patent is extended or adjusted under 35 U.S.C. 154(b) by 523 days.

(21) Appl. No.: 14/746,991

(22) Filed: Jun. 23, 2015

(65) Prior Publication Data

US 2015/0367543 A1 Dec. 24, 2015

(30) Foreign Application Priority Data

Jun. 24, 2014 (EP) .................................. 14002158

(51) Int. Cl.
*B29C 45/14* (2006.01)
*B29L 31/00* (2006.01)

(52) U.S. Cl.
CPC .... *B29C 45/14688* (2013.01); *B29C 45/1418* (2013.01); *B29C 2045/14213* (2013.01); *B29L 2031/722* (2013.01); *Y10T 428/24612* (2015.01)

(58) Field of Classification Search
None
See application file for complete search history.

(56) References Cited

U.S. PATENT DOCUMENTS

| 3,122,598 | A | * | 2/1964 | Berger | B29C 45/14688 264/132 |
| 4,126,727 | A | * | 11/1978 | Kaminski | B32B 5/20 101/32 |
| 4,810,540 | A | * | 3/1989 | Ellison | B29C 45/14311 428/208 |
| 4,898,706 | A | * | 2/1990 | Yabe | B29C 45/1418 264/132 |
| 4,902,557 | A | * | 2/1990 | Rohrbacher | B32B 27/32 264/176.1 |
| 4,960,558 | A | * | 10/1990 | Short | B29C 51/14 264/132 |
| 4,976,896 | A | * | 12/1990 | Short | B29C 51/14 264/1.34 |
| 5,342,666 | A | * | 8/1994 | Ellison | B29C 45/1418 428/174 |
| 5,707,697 | A | * | 1/1998 | Spain | B05D 1/286 428/208 |
| RE35,739 | E | * | 2/1998 | Ellison | B29C 45/14311 428/31 |
| 5,960,527 | A | * | 10/1999 | Ellison | B29C 45/1418 156/221 |
| 6,440,546 | B1 | * | 8/2002 | Fields | B29C 37/0025 428/220 |
| 7,776,423 | B2 | | 8/2010 | Suga et al. | |
| 7,906,054 | B2 | | 3/2011 | Hirschfelder et al. | |
| 8,597,793 | B2 | | 12/2013 | Saitou et al. | |
| 2004/0209063 | A1 | | 10/2004 | Gallagher et al. | |
| 2006/0029793 | A1 | * | 2/2006 | Overholt | B29C 43/003 428/325 |
| 2007/0026197 | A1 | | 2/2007 | Suga et al. | |
| 2007/0269671 | A1 | | 11/2007 | Hirschfelder et al. | |
| 2011/0143128 | A1 | | 6/2011 | Saitou et al. | |
| 2012/0021182 | A1 | | 1/2012 | Doan et al. | |
| 2014/0065384 | A1 | | 3/2014 | Saitou et al. | |
| 2015/0239159 | A1 | | 8/2015 | Leonhardt et al. | |

FOREIGN PATENT DOCUMENTS

| DE | 102004041833 A1 | 3/2006 |
| DE | 102010034879 A1 | 2/2011 |
| EP | 2298526 A1 | 3/2011 |
| EP | 1669191 B1 | 5/2013 |
| JP | 05-092538 A | 4/1993 |
| JP | 07-137221 A | 5/1995 |
| JP | 2000-6186 A | 1/2000 |
| JP | 2002067078 A | 3/2002 |
| WO | 94/03337 A2 | 2/1994 |
| WO | 2006/091532 A1 | 8/2006 |
| WO | 2010053142 A1 | 5/2010 |
| WO | 2014/044694 A1 | 3/2014 |

OTHER PUBLICATIONS

European Search Report dated Oct. 19, 2015 issued in corresponding EP 15001615 application (4 pages).
English Abstract of JP 2000-006186 A published Jan. 11, 2000.
Office Action in corresponding EP Application No. 15001615.2 dated Sep. 7, 2018. (pp. 1-7).

* cited by examiner

*Primary Examiner* — Edmund H Lee
(74) *Attorney, Agent, or Firm* — Millen White Zelano and Branigan, PC; Csaba Henter

(57) ABSTRACT

The present invention relates to a process for the production of three-dimensional patterns in plastic mouldings, in particular to an injection-moulding process for the production of mouldings having a three-dimensional pattern, to the polymeric mouldings produced by means of this process, and to the use thereof, in particular for decorative purposes.

19 Claims, No Drawings

PROCESS FOR THE PRODUCTION OF THREE-DIMENSIONAL PATTERNS IN PLASTIC MOULDINGS

The present invention relates to a process for the production of three-dimensional patterns in plastic mouldings, in particular to an injection-moulding process for the production of polymeric mouldings which have a three-dimensional pattern on one of their surfaces, to a polymeric moulding which has a three-dimensional pattern of this type, and to the use thereof.

Decorative three-dimensional patterns on plastic articles are known and have already been in use for some time. They give the said products an exclusive appearance which suggests depth and differs in an advantageous manner from conventional patterning. The mouldings or sheets are frequently embossed or otherwise structured on at least one of their surfaces in order ultimately to have a three-dimensional pattern. In order to achieve particular optical effects, both mouldings and also sheets are often combined in multiple layers and embossed in the multilayered structure. In addition, they can also be provided with functional and/or decorative coatings, usually in the form of paints, which may optionally also comprise metal-effect pigments and the like, in order, for example, to increase the gloss of the three-dimensional structures.

However, structuring of this type is usually associated with high equipment complexity, since embossing moulds and other complex structuring measures have to be integrated into the generally multistep process sequence of the product production, which is associated with effort and costs, in particular if the structured layer is subsequently to be coated further.

Thus, for example, JP-A-07-137221 and JP-A-05-092538 disclose decorative layer systems which each comprise embossed or otherwise structured layers, which may also comprise lustre pigments, usually applied via printing inks, between a polymeric substrate and a polymeric top layer. The production of composite materials of this type requires a multiplicity of different working steps and complex lamination or other bonding of different material layers to one another. Since both said cases represent the reproduction of natural wood grain, minor inaccuracies when laying the various material layers on top of one another in a bonding manner are possibly not associated with major disadvantages in visual terms. If, however, the patterning to be achieved is intended to take on precise, defined shapes, very accurate working is necessary, which has the consequence of increased complexity for the production process and thus also the production costs.

A simpler process for the production of decorative sheets and mouldings decorated therewith has therefore already been proposed in EP 1 669 191 B1. In this, a laminate comprising a transparent resin substrate sheet and a glossy layer applied to the back of the resin substrate sheet is embossed in such a way that protuberances and/or depressions form at least on the back surface carrying the glossy layer, resulting in areas having relatively high and low gloss on the front of the sheet. The laminate obtained in this way is deformed separately and can subsequently be bonded to a casting resin in an injection-moulding process in such a way that a shaped, decorated moulding forms. The gloss layer on the back of the decorative sheet is applied here via a printing ink comprising metal pigments or via the vapour deposition of a thin metal film on the transparent resin substrate sheet.

Although decorative sheets and mouldings having a pattern with a three-dimensional appearance which have glossy and less glossy surface areas alternating on their surface can be obtained in this way, their production requires firstly the production of a laminate and separate embossing and deformation thereof before the laminate can be bonded to a casting resin in a further working step to give the desired moulding. Since high temperatures are necessary, at least during the final working step, in order to bond the decorative film to the casting resin, damage of the embossed structures produced beforehand is probable, which may adversely affect the visual impression of the end product. In addition, production of defined embossed patterns with high line precision over the multiplicity of different working steps that are still present here is only possible with very great equipment complexity.

There is therefore still a need for a simple, fast and inexpensive production process for polymeric mouldings which have a three-dimensional pattern or a pattern with a three-dimensional appearance on their surface, which can be carried out with few process steps and results in attractive, glossy, three-dimensional patterns or patterns with a three-dimensional appearance on the surface of the mouldings, and for mouldings produced in this way.

The object of the present invention therefore contains or consists in providing a process which allows the production of highly defined, glossy, three-dimensional patterns or patterns with a three-dimensional appearance having fine line structures on polymeric mouldings in few working steps by means of shaping methods and equipment known per se.

A further object of the present invention contains or consists in providing polymeric mouldings which have a glossy, three-dimensional pattern or pattern with a three-dimensional appearance having fine line structures on at least one of their surfaces.

An additional object of the present invention contains or consists in indicating the use of the mouldings produced in this way.

The object of the present invention is achieved by an injection-moulding process for the production of a polymeric moulding which has a three-dimensional pattern on at least one of its surfaces, where an injection mould is provided which has injection mould parts A and B, which can be separated from one another and each have an inner surface A' and B' and together form an interior cavity, where inner surface A' has protuberances and/or depressions on a base area which form a three-dimensional pattern, and where, with the injection mould opened, a thermoplastic sheet, which is pigmented with flake-form effect pigments, is fixed to surface A', the injection mould is closed, a transparent thermoplastic melt is introduced into the interior cavity between the thermoplastic sheet and surface B' of injection mould part B, the injection mould is heated or cooled, and subsequently the polymeric moulding is demoulded or removed.

The object of the invention is furthermore achieved by a polymeric moulding having a surface B" and a surface A" having a three-dimensional pattern, where surface A" having the three-dimensional pattern which has protuberances and/or depressions which form the three-dimensional pattern on a base area is formed from a thermoplastic sheet which is pigmented with flake-form effect pigments, and where the thermoplastic sheet is strongly bonded (for example, in such a way that it cannot be peeled off) to a transparent thermoplastic in a form-fitting manner.

In addition, the object of the invention is also achieved by the use of the polymeric moulding described above as decorative and/or functional element in durable goods.

The present invention therefore relates to an injection-moulding process for the production of a polymeric moulding which has at least one surface having a three-dimensional pattern.

The injection-moulding process according to the invention essentially corresponds to a conventional injection-moulding process in which a dividable injection mould is employed whose interior cavity corresponds to the final shape of the moulding to be produced. A plastic melt is introduced into this cavity and subsequently allowed to solidify. The polymeric moulding produced is subsequently demoulded from the opened injection mould or removed therefrom.

For the process according to the invention, the conventional injection mould is modified in such a way that it has a surface in one of the injection mould parts (injection mould part A) which has protuberances and/or depressions on a base area which form a three-dimensional pattern. This pattern is preferably macroscopically visible and is, for example, in the form of a figure, an alphanumeric motif, a line and/or dot pattern, a logo, a code or a design. It is of importance for the purposes of the present invention that the three-dimensional pattern on surface A' preferably does not correspond to the outer shape of the polymeric moulding to be produced, which is formed by mould part A. Base area A', which in accordance with the invention carries the three-dimensional pattern in injection mould part A, may therefore also be curved per se or otherwise provided with protrusions and/or indentations which determine the outer shape of the polymeric moulding to be produced which is produced from this mould part. These curves or protrusions and/or indentations in surface A' are preferably not identical with the three-dimensional pattern produced in accordance with the invention. Instead, the three-dimensional pattern produced in accordance with the invention is preferably located on surface A' in addition to the protuberances and/or protrusions and/or indentations, if present, determining the outer shape of the polymeric moulded part to be produced. In structural terms, the base area of surface A' should therefore be regarded as a planar area which has a smooth, flat structure in relation to its surface nature. Inner surface B' of injection mould part B also preferably represents a "planar surface" of this type. Inner surface B' may accordingly likewise have curves or protrusions and indentations which determine the outer shape of the part of the polymeric moulding to be produced from this mould part. For the purposes of the invention, "planar surface" is taken to mean a surface which is formed with a smooth, flat structure preferably without visible roughness, without taking into account its outer shape.

In a further embodiment of the present invention, however, inner surface B' may also be formed in such a way that it likewise has a three-dimensional pattern in accordance with the present invention.

The three-dimensional pattern on surface A' has protuberances and/or depressions which can have a height/depth from about 10 μm to a few centimeters and line widths from 100 μm to 2000 μm. The area of the three-dimensional pattern can range from a few square millimeters to a few hundred square centimeters. These dimensions essentially depend on the size and wall thickness of the polymeric moulding to be produced, on the thickness of the thermoplastic sheet and on the function that the three-dimensional pattern is intended to fulfill in the polymeric moulding and can be adapted correspondingly.

The three-dimensional pattern can be introduced into injection mould part A either directly or alternatively via a correspondingly adapted insert. The latter is advantageous since inserts of this type can be produced so as to be replaceable and in this way polymeric mouldings of the same shape with a very wide variety of three-dimensional motifs can be obtained by rapid and easy replacement of the pattern inserts.

In accordance with the invention, a thermoplastic sheet which is pigmented with flake-form effect pigments is fixed to inner surface A' with the injection mould opened. The outer shape of the sheet and its geometrical thickness here must be such that the sheet can be introduced into injection mould part A and also fixed to its inner surface A'. This temporary fixing is advantageously carried out by application of a vacuum, by spot adhesive points which can easily be detached on exposure to elevated temperature, or other suitable, temporary fixing measures, such as, for example, clamps or frames.

Suitable polymeric plastic materials for the thermoplastic sheet are the conventional thermoplastic materials, such as, for example, polystyrene (PS), polypropylene (PP), polycarbonate (PC), polymethyl methacrylate (PMMA), styrene-acrylonitrile (SAN), various thermoplastic elastomers (TPEs) or acrylonitrile-butadiene-styrene (ABS), to mention but a few. It may also be possible to employ further copolymers other than those mentioned above which contain the above-mentioned polymers.

The sheets shaped from the thermoplastic materials are in accordance with the invention pigmented with flake-form effect pigments. The flake-form effect pigments here can be introduced into or applied to the thermoplastic sheet in various ways. Thus, the flake-form effect pigments can be applied to the entire surface or part of a surface of the thermoplastic sheet as constituent of a printing ink or coating composition, but they can also be applied, in the case of metal-effect pigments, to the surface of the sheet with the aid of a vapour deposition process. In each case, coating is preferably carried out over the entire area. The process steps and materials required for the various coating methods are familiar to the person skilled in the art and do not have to be described in greater detail here.

However, the pigmentation of the thermoplastic sheet is very particularly preferably carried out via mass colouring of the sheet. This means that flake-form effect pigments in suitable shape and amount are added to the polymeric plastics as early as during sheet production and are converted into sheets together with the plastics, which is generally carried out by extrusion. This can be carried out by direct addition of flake-form effect pigments to plastic granules or also by the preparation of compounds comprising effect pigments or through masterbatches with subsequent joint granulation.

Combined pigmentation of the sheet with the aid of mass colouring and an additional printing or coating process is also possible.

The pigmented thermoplastic sheet employed in accordance with the invention comprises the flake-form effect pigments in an amount of 0.1 to 20% by weight, based on the total weight of the pigmented sheet. Proportions of 0.5 to 5% by weight are particularly preferred here. All pigment proportions here are based on the pigmented sheet, i.e. on the coated, printed or mass-coloured sheet. In addition to the flake-form effect pigments, the pigmented thermoplastic sheet may also comprise further inorganic or organic coloured pigments, dyes and/or fillers.

The conventional colorants and fillers generally employed for the colouring of plastic sheets or printing inks or coating compositions are suitable here so long as they do not permanently impede the optical effects achieved by the flake-form effect pigments. For certain polymers, for example PET, preference is given to organic dyes, which are soluble in the polymeric plastic material and uniformly colour the resultant sheets without having an interfering particulate character.

Other polymer sheets or binders may also be provided with organic or inorganic coloured pigments or fillers in particle form.

The flake-form effect pigments employed in the process in accordance with the present invention can be all known flake-form effect pigments so long as they are visible in or on the thermoplastic sheet. Flake-form effect pigments of this type are advantageously selected from the group pearlescent pigments, interference pigments, metal-effect pigments, flake-form functional pigments, flake-form structured pigments, or a mixture thereof. These effect pigments are built up from one or more layers of different materials and are in flake form.

These pigments preferably have a flake-form substrate on which one or more layers are located, where at least the substrate and the layer located directly on the substrate and/or at least two layers of the coating which are in each case adjacent differ from one another in their refractive indices n at least by the value $\Delta n=0.1$. The layers located on the substrate here are preferably metals, metal oxides, metal oxide hydrates or mixtures thereof, metal mixed oxides, suboxides, oxynitrides, metal fluorides or polymer materials.

Pearlescent pigments contain or consist of transparent flakes of high refractive index and exhibit a characteristic pearlescence due to multiple reflection in the case of parallel alignment. Pearlescent pigments of this type which additionally also exhibit interference colours are known as interference pigments.

Although classical pearlescent pigments, such as $TiO_2$ flakes, basic lead carbonate, BiOCl pigments or nacreous pigments, are naturally also suitable in principle, the effect pigments employed for the purposes of the invention are preferably flake-form interference pigments or metal-effect pigments, which have at least one coating of a metal, metal oxide, metal oxide hydrate or mixtures thereof, a metal mixed oxide, metal suboxide, metal oxynitride, metal fluoride or a polymer on a flake-form substrate.

The metal-effect pigments preferably have at least one metal substrate or a metal coating.

The flake-form substrate preferably contains or consists of natural or synthetic mica, kaolin or another phyllosilicate, glass, calcium aluminium borosilicate, $SiO_2$, $TiO_2$, $Al_2O_3$, $Fe_2O_3$, polymer flakes, graphite flakes or metal flakes, such as, for example, of aluminium, titanium, bronze, silver, copper, gold, steel or diverse metal alloys.

Particular preference is given to flake-form substrates comprising mica, glass, calcium aluminium borosilicate, graphite, $SiO_2$, $Al_2O_3$ or aluminium.

The size of the flake-form substrates is not crucial per se, but the flake-form effect pigments must be visible in or on the thermoplastic sheet and be capable of being oriented with or in the sheet. The substrates generally have a thickness of between 0.01 and 5 µm, in particular between 0.05 and 4.5 µm and particularly preferably from 0.1 to 1 µm. The length or width dimension is usually from 5 to 250 µm, preferably from 5 to 100 µ.m and in particular from 5 to 125 µm. They generally have an aspect ratio (ratio of mean diameter to mean particle thickness) of at least 2:1, preferably of from 3:1 to 500:1 and in particular from 6:1 to 250:1.

The said dimensions for the flake-form substrates also apply in principle to the coated effect pigments used in accordance with the invention, since the additional coatings are generally in the region of only a few hundred nanometers and thus do not significantly influence the thickness or length or width (particle size) or thickness of the pigments.

A coating applied to the support preferably contains or consists of metals, metal oxides, metal mixed oxides, metal suboxides or metal fluorides and in particular of a colourless or coloured metal oxide selected from $TiO_2$, titanium suboxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof.

Coatings of metals are preferably of aluminium, titanium, chromium, nickel, silver, zinc, molybdenum, tantalum, tungsten, palladium, copper, gold, platinum or alloys comprising these.

The metal fluoride employed is preferably $MgF_2$.

Particular preference is given to effect pigments which have a flake-form substrate comprising mica, glass, calcium aluminium borosilicate, graphite, $SiO_2$, $Al_2O_3$ or aluminium and at least one layer on the substrate, selected from $TiO_2$, titanium suboxides, titanium oxynitrides, $Fe_2O_3$, $Fe_3O_4$, $SnO_2$, $Sb_2O_3$, $SiO_2$, $Al_2O_3$, $MgF_2$, $ZrO_2$, $B_2O_3$, $Cr_2O_3$, ZnO, CuO, NiO or mixtures thereof.

The effect pigments can have a multilayered structure in which a plurality of layers, which preferably contain or consist of the above-mentioned materials and have different refractive indices in such a way that in each case at least two layers of different refractive index are located alternately on the support, where the refractive indices in the individual layers differ by at least 0.1 and preferably by at least 0.3 from one another, are located one above the other on a metallic or non-metallic support. The layers located on the support here may be either colourless or coloured, predominantly transparent, semi-transparent or even opaque.

Depending on the substrate material used and the type of layers applied, the effect pigments obtained are thus also colourless or have a mass tone, or are predominantly transparent, semi-transparent or opaque. Due to the single- or multilayered system on the substrate, however, they are additionally capable of producing more or less intense and lustrous interference colours.

Polymer or metal flakes, also known as holographic pigments, can likewise be employed as flake-form effect pigments. In addition, it is also possible to employ flake-form effect pigments whose choice of material in the substrate or coating additionally results in magnetic, electrically conductive, fluorescent or other functional properties of the corresponding effect pigments.

The effect pigments described above may be present individually or as a mixture of two or more in the pigmented thermoplastic sheet employed in accordance with the invention.

Effect pigments which can be employed are, for example, the commercially available functional pigments, interference pigments or pearlescent pigments offered by Merck KGaA under the names IRIODIN®, COLORSTREAM®, XIRALLIC®, MIRAVAL®, RONASTAR®, BIFLAIR®, MINATEC®, LUSTREPAK®, COLORCRYPT®, COLORCODE® and SECURALIC®, MEARLIN® from Mearl, metal-effect pigments from Eckart and optically variable effect pigments, such as, for example, VARIOCHROM® from BASF, CHROMAFFLAIR® from Flex Products Inc., HELICONE® from Wacker, holographic pigments from Spectratec and other commercially available effect pigments.

The geometrical thickness of the pigmented thermoplastic sheet employed in accordance with the invention can vary in a broad range and is preferably in the range from 20 to 2000 µm, in particular from 50 to 500 µm. These figures relate both to printed/coated sheets and also to mass-coloured sheets.

After the thermoplastic sheet pigmented with the flake-form effect pigments has been fixed to surface A', the injection mould is closed and a transparent thermoplastic melt is introduced into the injection mould cavity remaining between the thermoplastic sheet and surface B' of injection mould part B. Injection mould part A with inner surface A' represents the ejector side and injection mould part B with inner surface B' represents the nozzle side of the injection mould. After the introduction of the plastic melt into the cavity, the latter is completely filled by the plastic melt. The introduction of the transparent plastic melt into the injection mould cavity is preferably carried out under increased pressure and at elevated temperature, in each case depending on the materials used. The temperature of the plastic melt here is at least as high as the glass transition temperature $T_G$ of the plastic component of the thermoplastic sheet and is preferably above this. Due to the action of the hot plastic melt and the pressure that the molten transparent plastic material exerts on the pigmented thermoplastic sheet during the introduction into the injection mould cavity, the thermoplastic sheet reaches a temperature which allows mechanical deformation of the sheet. The specific working temperature in each case depends on the processed plastics and is usually in the range from 120° C. to 400° C., preferably from 200° C. to 280° C. The pressure employed in the process during the introduction of the thermoplastic melt into the injection mould cavity is also in each case machine- and material-dependent and is usually in the range from 100 to 2500 bar ($1 \times 10^7$ N/m$^2$ to $2.5 \times 10^8$ N/m$^2$).

During the introduction of the transparent thermoplastic melt into the injection mould, the thermoplastic sheet which is fixed to surface A' warms until it becomes mechanically deformable and is able to come into close form-fitting contact with inner surface A'. The three-dimensional pattern present in A' is thereby replicated on the sheet surface facing surface A' in the form of the negative of the three-dimensional pattern present on surface A'. At the same time, the hot plastic melt flows into the cavity between the thermoplastic sheet and inner surface B' and "covers" the three-dimensional positive pattern which has at the same time formed on the thermoplastic sheet surface projecting into the cavity. On subsequent hardening of the resultant moulding, a strong, form-fitting bond forms between the thermoplastic sheet pigmented with flake-form effect pigments and the plastic formed from the transparent thermoplastic melt, this bond being manifested in the subsequent cooling or heating operation. When the moulding has hardened sufficiently, it can be demoulded or removed from the injection mould. It has on its outer surface (A") formed by the thermoplastic sheet a three-dimensional pattern which corresponds to the negative image of the three-dimensional pattern which is present on surface A' in the interior of the injection mould. If surface B" formed by inner surface B' of the polymeric plastic body containing or consisting of the thermoplastic formed from the transparent thermoplastic melt by hardening is used as the visible side and if the hardened plastic melt is transparent, a three-dimensional pattern with a deep appearance which corresponds identically in its shape to the pattern present on inner surface A' of the injection mould can be perceived from the viewpoint of surface B". Depending on the outer shape of inner surface B' and its surface nature, surface B" of the polymeric moulding can have a smooth and flat or coarsely and/or finely structured nature.

The colouring, functionality and gloss behaviour of the three-dimensional pattern corresponds here to the colouring, functionality and gloss behaviour of the entire surface A" formed by the pigmented thermoplastic sheet. This means that the gloss behaviour of the three-dimensionally patterned part of surface A" does not differ in specular angle from the gloss behaviour of the unpatterned part of surface A" (formed by base area A'), irrespective of which part-area of the three-dimensional pattern is considered.

Colouring, functionality and gloss behaviour of surface A" are crucially determined by the flake-form effect pigments present in the pigmented thermoplastic sheet, optionally supplemented by additional colorants and/or fillers which are also located in or on the thermoplastic sheet.

If the transparent thermoplastic melt comprises a soluble colorant or small amounts of a particulate colorant, the colouristic impression which can be perceived from the side of surface B", of the three-dimensional pattern and of surface A" surrounding the latter can also be modified as desired. Although soluble colorants result in an inherent colour of the thermoplastic melt and the part of the polymeric plastic body produced therewith, they have virtually no or absolutely no adverse effect on the transparency of this part of the plastic body.

The transparent thermoplastic melt contains or consists (optionally besides conventional fillers and assistants as well as colorants as described) of thermoplastics. These may, as already described above regarding the thermoplastic sheets, contain or consist of conventional thermoplastics and encompass the same substance groups as described above. The plastic materials employed in the thermoplastic sheet and in the thermoplastic melt preferably have identical, partially identical or at least similar melting points and melting behaviours in order to simplify complete material bonding of the two substance groups during the injection-moulding process and in order to facilitate an unbreakable, strong and form-fitting bond. However, for carrying out the process according to the invention, it is sufficient if the temperature of the transparent thermoplastic melt has at least the value of the glass transition temperature $T_G$ of the plastic component of the pigmented thermoplastic sheet. The starting materials for the thermoplastic sheet and the transparent thermoplastic melt can be selected in accordance with this prerequisite.

In the case where it is necessary to employ plastic materials which have very different melting points and melting behaviours or do not satisfy the above conditions regarding glass transition temperature and melting point for the thermoplastic sheet pigmented with flake-form effect pigments and the thermoplastic melt, an adhesion-promoting layer applied to the thermoplastic sheet surface projecting into the injection mould cavity may be helpful in the thermal bonding of sheet and melt. This also applies to thermal non-compatibility of the binder systems of a pigmented printed layer or coating on the thermoplastic sheet, since the printed layer or coating, if present, are preferably located on the thermoplastic sheet surface projecting into the injection mould cavity. The adhesion-promoting layer ensures an unbreakable bond of sheet and plastic melt and can be selected by the person skilled in the art on the basis of his expert knowledge.

The deformation of the thermoplastic sheet pigmented with the flake-form effect pigments against inner surface A' during the injection-moulding process gives rise to a spatial re-orientation of the flake-form effect pigments present in the sheet. Due to the mechanical longitudinal orientation of the force effect during the sheet production process or during the printing or coating operation, these are usually present in or on the pigmented sheet with their longitudinal axes substantially in approximately parallel orientation relative to the sheet surface. The form-fitting adaptation of the plastic component of the sheet to inner surface A' of the injection mould results in the flake-form effect pigments in the part of surface A' carrying the three-dimensional pattern orienting themselves in such a way that, in addition to the local deformation of the sheet body, the flake-form effect pigments also re-orient themselves along the three-dimensional pattern in the plastic material or in the printed layer or coating and thus likewise replicate the three-dimensional pattern of surface A'. This re-orientation of the effect pigments is fixed during the solidification process of the thermoplastic material. A more clearly visible re-orientation of the flake-form effect pigments can be achieved here with mass-coloured thermoplastic sheets than with printed or coated sheets, especially as damage of the surface quality during the reshaping must not be expected here.

Gloss and colouring of the flake-form effect pigments result in a particularly strong perception of the three-dimensional pattern on the surfaces of the polymeric moulding produced, both on surface A" carrying the three-dimensional pattern and also, in a particularly impressive manner, also perceptible from the side of surface B" from which the three-dimensional pattern merely appears three-dimensional, but cannot be touched. The visible three-dimensional pattern is significantly more pronounced here than would be expected from the actual deformation of the thermoplastic sheet, since a deflection of the flake-form effect pigments out of the parallel position, even by only a few angle degrees, already results in a significant change in their reflection properties. Observed at the respective specular angle, the gloss achieved by the effect pigments is, however, retained over the entire area of the part of the polymeric moulding formed by the thermoplastic sheet, both when observed from surface A" and also from surface B".

The present invention also relates to a polymeric moulding having a surface B" and a surface A" having a three-dimensional pattern, where surface B" is formed from a transparent thermoplastic and surface A" having the three-dimensional pattern which has protuberances and/or depressions which form the three-dimensional pattern on a base area is formed from a thermoplastic sheet which is pigmented with flake-form effect pigments, where the transparent thermoplastic and the thermoplastic sheet are strongly bonded to one another in a form-fitting manner. Such mouldings can be produced by the injection-moulding process according to the invention described above.

The material compositions of thermoplastic sheet, flake-form effect pigments and transparent thermoplastic have already been described in detail above. Reference is expressly made here to this description with respect to the moulding according to the invention.

If the plastic used in the thermoplastic sheet or the binder systems used in a printed layer or coating are not sufficiently thermally compatible with the melting behaviour of the transparent thermoplastic which forms surface B" of the moulding according to the invention in order to be able to be strongly bonded to one another in a form-fitting manner by means of a single process step, the moulding according to the invention advantageously has an adhesion-promoting layer between the pigmented thermoplastic sheet and the hardened thermoplastic. This layer contains or consists of one or more polymeric plastics and forms an unbreakable, strong bond between the thermoplastic sheet and the transparent thermoplastic. The choice of suitable material can be made by the person skilled in the art on the basis of his expert knowledge in accordance with the respective requirement.

The three-dimensional pattern comprising protuberances and/or depressions on a preferably planar surface, which is located on surface A" of the moulding according to the invention is the negative pattern of the three-dimensional pattern located on inner surface A' of injection mould part A.

As already described above, the size of the vertical and horizontal extent of the three-dimensional pattern on surface A" can vary in broad ranges, which is selected depending on the size and wall thickness of the polymeric moulding and the thickness of the thermoplastic sheet and the intended purpose of the three-dimensional pattern on the polymeric moulding (example: code versus decorative effect). The thickness of the thermoplastic sheet generally represents the upper limit for the height or depth of the protuberances and/or depressions in the thermoplastic sheet, but in individual cases these may also exceed the thickness of the thermo-plastic sheet.

The three-dimensional pattern on surface A" of the polymeric moulding has protuberances and/or depressions from a height/depth of about 10 µm to a few centimeters and line widths from 100 µm to 2000 µm. The area of the three-dimensional pattern can range from a few square millimeters to a few hundred square centimeters and is, like the height/depth and width of the depressions or protuberances, measured in accordance with the above-mentioned criteria.

The three-dimensional pattern in surface A" of the polymeric moulding preferably contains or consists merely of depressions or protuberances of the same or different depth or height which are located on an otherwise planar surface A".

The polymeric moulding according to the invention is particularly visually attractive if surface B" is used as "show side" and surface A", which has the negative motif of the three-dimensional pattern on inner surface A' of injection mould part A, is used as the back of the body.

Since the three-dimensional pattern located on surface A", observed from surface B", represents the identical copy of the three-dimensional pattern located on the inner surface A' of injection mould part A and the three-dimensional effect is considerably enhanced visually by the flake-form effect pigments located in or on the thermoplastic sheet and the transparent plastic material on top, although the three-dimensional pattern, observed from this surface, cannot be touched, but instead only appears three-dimensional, high visual attractiveness as well as complete mechanical protection of the three-dimensional pattern are achieved when observed in this way.

In this embodiment, it is additionally also possible for at least one additional layer, which may be in the form of a protective layer, colour-enhancing layer, support layer, adhesive layer or the like, to be located on the back A" carrying the three-dimensional pattern. Suitable materials and application techniques are available to the person skilled in the art, depending on the purpose of this additional layer and of the polymeric moulding, and require no further explanation here.

The present invention also relates to the use of the polymeric moulding described above as decorative and/or functional element in durable goods.

Durable goods here are essentially and preferably packaging, products from the electrical and electronics industry, domestic appliances, furniture, clothing, bags, shoes, sports articles or vehicles. In principle, however, the polymeric mouldings according to the invention can be employed in all areas in which polymeric mouldings which can be produced in an injection-moulding process and have a readily visible, attractive three-dimensional pattern, which, if required, may also be impossible to touch, can advantageously be employed.

The present invention provides a simple and inexpensive injection-moulding process with the aid of which it is possible to produce, in a single working step, polymeric mouldings which have on at least one of their surfaces a visually attractive three-dimensional pattern, which is, if required, additionally provided with functional properties, which can, if required, be used on both sides and, observed from each of their surfaces, give rise to a uniform visual appearance whose colour, gloss and functionality can be adjusted in a variable manner, that additionally has a three-dimensional pattern which can be adjusted before the beginning of the process and meets needs and which may have fine lines in high precision. The process according to the invention can be carried out using slightly modified conventional injection-moulding machines and is therefore inexpensive and can be adapted in line with needs. With the aid of the process according to the invention, complex mouldings which are free from flow lines and are coloured impressively with effect pigments can be produced in a simple, inexpensive manner. The mouldings according to the invention obtained are durable and have, at least in one embodiment, an unembossed surface of high visual attractiveness and a virtually indestructible three-dimensional pattern having high line sharpness. They are of uniform colour and of high gloss and can be employed in a variable manner in many industrial and decorative areas of application.

The invention will be explained in greater detail below with reference to examples, but is not intended to be restricted thereto.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. EP 14002158.5, filed Jun. 24, 2014, are incorporated by reference herein.

EXAMPLE 1

An ABS sheet having a content of 0.5% by weight of COLORSTREAM® Autumn Mystery (flake-form effect pigment based on $SiO_2$ substrates, particle size 5-50 µ, product from Merck KGaA) and 0.05% by weight of PV True Blue A2R (product from Clariant International Ltd.) having a thickness of about 400 µm is cut to a size of 100×150 mm and spot-fixed via adhesive spots to the inner surface of the mould insert of an injection mould part (ejector side) which has a three-dimensional raised object as pattern.

An injection-moulding machine of the Kraus-Maffei CX-130-380 type is used. After closing of the mould, a transparent plastic melt (SAN LURAN® 358 N, product from BASF SE) is injected into the cavity remaining in the injection mould between the pigmented thermoplastic sheet and the surface of the injection mould not provided with the sheet (nozzle side). The injection operation is carried out at a temperature in the range from 220 to 260° C. and a pressure in the range from 450 to 900 bar ($4.5 \times 10^7$ $N/m^2$ to $9 \times 10^7$ $N/m^2$).

After the cooling operation and the opening of the injection mould, a plastic plate is obtained whose first surface has an intensely coloured, uniformly glossy surface of varying colour with a three-dimensional pattern located therein which corresponds to the negative motif of the three-dimensional pattern located in the injection mould and whose other surface is flat and is formed from a transparent, colourless plastic. Observed from the side of the transparent plastic surface, the three-dimensional pattern of the other surface appears as positive pattern with high gloss and with particular optical depth and imparts the impression of a three-dimensional object behind glass.

EXAMPLE 2

Example 1 is repeated, with the modification that a polystyrene sheet is employed which is pigmented with 1% by weight of IRIODIN® 305 Solar Gold (flake-form effect pigment based on mica, particle size 10-60 µm, product from Merck KGaA). All other parameters remain unchanged. A plastic plate is obtained which has on one surface a surface layer which has a strongly golden gloss and is provided with a three-dimensional pattern. Observed from the opposite surface of the plastic plate, the negative image of the three-dimensional pattern appears with a strong gloss with deep-golden colour, uniform gloss and high depth effect.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An injection-moulding process for the production of a polymeric moulding which has a three-dimensional pattern on at least one of its surfaces, comprising
    fixing a thermoplastic sheet into an injection mould which has injection mould parts A and B, which can be separated from one another and each have an inner surface A' and B' and together form an interior cavity, where inner surface A' has protuberances and/or depressions on a base area which form a three-dimensional pattern, wherein the fixing of the thermoplastic sheet occurs to the surface A' with the injection mould opened, which thermoplastic sheet is pigmented with flake-form effect pigments in an amount of 0.5 to 5% by weight, based on the total weight of the thermoplastic sheet,
    closing the injection mould, introducing a transparent thermoplastic melt into the interior cavity between the thermoplastic sheet and surface B' of injection mould part B, heating or cooling the injection mould, and subsequently demoulding or removing the polymeric moulding, wherein the flake-form effect pigments re-orient themselves along the three-dimensional pattern and thus replicate the three-dimensional pattern of surface A' on the polymeric moulding, and wherein the process is carried out at least at a temperature which is at or above the glass transition temperature $T_G$ of the thermoplastic sheet.

2. A process according to claim 1, wherein the three-dimensional pattern is a macroscopic pattern in the form of a figure, an alphanumeric motif, a line and/or dot pattern, a logo, a code or a design.

3. A process according to claim 1, wherein the flake-form effect pigments are pearlescent pigments, interference pigments, metal-effect pigments, flake-form functional pigments, flake-form structured pigments, or a mixture thereof.

4. A process according to claim 1, wherein the flake-form effect pigments have a particle size in the range from 5 to 250 µm and an aspect ratio of at least 2.

5. A process according to claim 1, wherein the flake-form effect pigments contain a flake-form substrate and one or more layers on the substrate, where the substrate and the layer located directly on the substrate and/or at least two layers which are in each case adjacent differ from one another in their refractive indices n at least by $\Delta n=0.1$.

6. A process according to claim 1, wherein the pigmented thermoplastic sheet, in addition to the flake-form effect pigments, also comprises further organic or inorganic coloured pigments, dyes and/or fillers.

7. A process according to claim 1, wherein in the polymeric moulding, the thermoplastic sheet is mass-coloured with flake-form effect pigments.

8. A process according to claim 1, wherein in the polymeric moulding, an adhesion-promoting layer is located between the transparent thermoplastic and the thermoplastic sheet.

9. A process according to claim 1, wherein in the polymeric moulding, the three-dimensional pattern on surface A" is a motif negative and surface A" having the three-dimensional pattern represents the back of the moulding.

10. A process according to claim 1, wherein the polymeric moulding has at least one additional layer on surface A".

11. A process according to claim 1, wherein the polymeric moulding is contained in a durable good as a decorative and/or functional element.

12. A process according to claim 1, wherein the durable good is selected from the group consisting of packaging, products from the electrical and electronics industry, domestic appliances, furniture, clothing, bags, shoes, sports articles and vehicles.

13. A process according to claim 1, further comprising providing an adhesion-promoting layer on top of the thermoplastic sheet prior to introducing the transparent thermoplastic melt.

14. A process according to claim 1, wherein the thermoplastic sheet is coated with flake-form effect pigments on its entire area.

15. A process according to claim 1, wherein the thermoplastic sheet is mass-coloured with flake-form effect pigments.

16. A process according to claim 1, wherein the amount of the pigmented with flake-form effect pigments is 0.5 to 1% by weight, based on the total weight of the thermoplastic sheet.

17. A process according to claim 1, wherein the amount of the pigmented with flake-form effect pigments is 1 to 5% by weight, based on the total weight of the thermoplastic sheet.

18. An injection-moulding process for the production of a polymeric moulding which has a three-dimensional pattern on at least one of its surfaces, comprising providing an injection mould which has injection mould parts A and B, which can be separated from one another and each have an inner surface A' and B' and together form an interior cavity, where inner surface A' has protuberances and/or depressions on a base area which form a three-dimensional pattern, and where, with the injection mould opened, fixing a thermoplastic sheet which is pigmented with flake-form effect pigments in an amount of 0.5 to 5% by weight, based on the total weight of the thermoplastic sheet, to the surface A', wherein the thermoplastic sheet is mass-coloured with flake-form effect pigments, closing the injection mould, introducing a transparent thermoplastic melt into the interior cavity between the thermoplastic sheet and surface B' of injection mould part B, heating or cooling the injection mould, and subsequently demoulding or removing the polymeric moulding, wherein the flake-form effect pigments re-orient themselves along the three-dimensional pattern and thus replicate the three-dimensional pattern of surface A' on the polymeric moulding, and wherein the process is carried out at least at a temperature which is at or above the glass transition temperature $T_G$ of the thermoplastic sheet.

19. An injection-moulding process for the production of a polymeric moulding which has a three-dimensional pattern on at least one of its surfaces, which process is performed in an injection mould which has injection mould parts A and B, which can be separated from one another and each have an inner surface A' and B' and together form an interior cavity, where inner surface A' has protuberances and/or depressions on a base area which form a three-dimensional pattern, said process comprising fixing a thermoplastic sheet, which is pigmented with flake-form effect pigments in an amount of 0.5 to 5% by weight, based on the total weight of the thermoplastic sheet, to the surface A' before introduction of a transparent thermoplastic melt into the interior cavity between the thermoplastic sheet and surface B' of injection mould part B, wherein the flake-form effect pigments re-orient themselves along the three-dimensional pattern and thus replicate the three-dimensional pattern of surface A' on the polymeric moulding, and wherein the process is carried out at least at a temperature which is at or above the glass transition temperature $T_G$ of the thermoplastic sheet.

* * * * *